Patented Mar. 9, 1937

2,073,010

UNITED STATES PATENT OFFICE 2,073,010

HALOGENATED ARALKYL-ARYL ETHERS

Harold S. Holt, Wilmington, Del., assignor to E. I. du Pont de Nemours & Company, Wilmington, Del., a corporation of Delaware No Drawing. Application April 22, 1936
Serial No. 75,870

8 Claims. (Cl. 260—150)

This invention relates to halogenated aralkyl-aryl ethers, more particularly to halogenated benzyl-phenyl ethers containing three or more halogen atoms on each aromatic nucleus, and to a process for the preparation thereof.

It is an object of the invention to prepare new and useful halogenated aralkyl-aryl ethers containing a plurality of halogen atoms attached to each aromatic ring. Another object is the preparation of halogenated benzyl-phenyl ethers containing three or more halogens attached to each aromatic ring. A further object is to provide a process of producing compounds of the character above described. Other objects will appear hereinafter.

In accomplishing these objects according to this invention, halogenated aralkyl-aryl ethers containing a plurality of halogen atoms in each aromatic ring have been prepared by reacting halogenated aralkyl halides containing a plurality of halogen atoms in the aromatic ring with alkali metal salts of halogenated phenols containing a plurality of ring halogen atoms. The preferred products contain at least three halogen atoms in each aromatic ring and are prepared from aralkyl halides and alkali metal salts of phenols containing at least three halogen atoms in each aromatic ring.

As an illustration of the invention, it has been found that halogenated benzyl chlorides react with the sodium salts of halogenated phenols to give halogenated benzyl-phenyl ethers. The reaction involves the formation of sodium chloride and condensation of the halogenated benzyl and halogenated phenyl nuclei, and may be represented by the following equation:

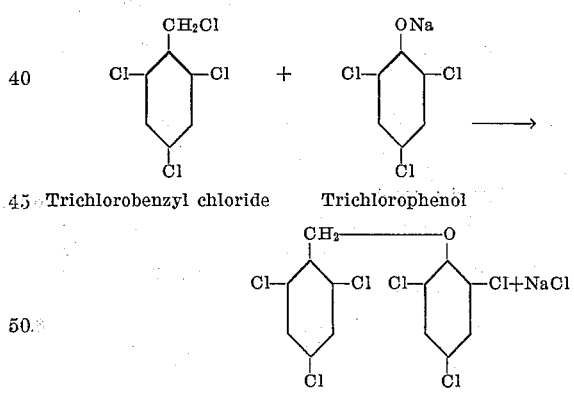

Trichlorobenzyl chloride    Trichlorophenol

Trichlorobenzyl-trichlorophenyl ether

The reaction is conveniently carried out by heating an alcoholic solution of the sodium salt of the halogenated phenol with the halogenated aralkyl halide at the boiling point of the alcohol solvent for several hours. The yields are excellent in most cases.

The invention is further illustrated but not limited by the following examples in which the quantities are stated in parts by weight.

Example I

*Preparation of trichlorobenzyl-trichlorophenyl ether*

Sixty-six (66) parts of symmetrical trichlorophenol were dissolved in about 400 parts of ethyl alcohol, and 14.7 parts of powdered sodium hydroxide were added to the resulting solution. The reaction mixture was warmed on a steam bath and stirred until the sodium hydroxide had completely dissolved. To the resulting solution 77.8 parts of trichlorobenzyl chloride were added, after which the solution was heated on a steam bath under a reflux condenser overnight. A mixture of trichloro-benzyl-trichlorophenyl ether and sodium chloride precipitated out. The reaction mixture was diluted with a large volume of ethyl alcohol and heated to boiling. The reaction product dissolved, and was filtered from the sodium chloride, which remained suspended in the alcohol solution. The reaction product crystallized from the filtrate on cooling. It was filtered, washed with cold ethyl alcohol, and dried. The reaction product was recrystallized from hot alcohol from which it separated in snow-white needles melting at 101°–103° C. Analysis showed the chlorine content to be 54.3% chlorine, which corresponds closely to trichlorobenzyl-trichlorophenyl ether (calculated chlorine content 54.47%). The approximate alpha and beta refractive indices of this compound, as determined by the immersion method using white light, were 1.56 and 1.75, respectively.

Example II

*Preparation of tetrachlorobenzyl-pentachlorophenyl ether*

Thirteen (13) parts of tetrachlorobenzyl chloride and 13.3 parts of pentachlorophenol were dissolved in 40 parts of ethyl alcohol, and 2 parts of powdered sodium hydroxide were added. The reaction mixture was heated on a steam bath under a reflux condenser overnight. The reaction product mixed with sodium chloride precipitated out, was filtered off, washed with water to remove sodium chloride, and crystallized from hot dioxane. Tetrachlorobenzyl - pentachlorophenyl ether is a snow-white compound crystallizing in needles melting at 202° C. (calculated chlorine content 64.61%; chlorine found 64.46%). The approximate alpha and beta refractive indices of this compound, as determined by the immersion method using white light, were 1.56 and 1.78, respectively.

Example III

*Preparation of pentachlorobenzyl-pentachlorophenyl ether*

Two (2) parts of powdered sodium hydroxide were dissolved in about 200 parts of ethyl alcohol, and 13.3 parts of pentachlorophenol were added to the resulting solution. This solution was warmed on a steam bath and 15 parts of pentachlorobenzyl chloride added. The resulting solution was heated on a steam bath under a reflux condenser overnight. An insoluble reaction product mixed with sodium chloride precipitated out and was filtered off. The precipitate was stirred with 250 parts of water to remove sodium chloride and again filtered, washed with ethyl alcohol, and dried. The product was purified by crystallization from a large volume of hot dioxane from which it separated as white needle-like crystals, melting at 254°–255° C. This product was substantially pure pentachlorobenzyl-pentachlorophenyl ether (chlorine calculated 67.10%; chlorine found 66.16%). The approximate alpha and beta refractive indices of this compound, as determined by the immersion method using white light, were 1.56 and 1.81, respectively.

*Example IV*

*Preparation of tetrachlorobenzyl-tribromophenyl ether*

Seventy and six-tenths (70.6) parts of tribromophenol were dissolved in about 400 parts of ethyl alcohol, and 9 parts of powdered sodium hydroxide added. The mixture was warmed until the sodium hydroxide had dissolved, after which 56.5 parts of tetrachlorobenzyl chloride were added. The resulting solution was heated under a reflux condenser at the boiling point of the solvent for two hours. The reaction product which precipitated out was worked up as described in Example III. The yield of crude reaction product (tetrachlorobenzyl-tribromophenyl ether) was 101 parts or 84.8% based on the tetrachlorobenzyl chloride used. The reaction product was crystallized from hot dioxane and melted at 178° C.

Similarly, other polyhalogenated aralkyl halides, e. g., polychloroxylyl chlorides, polybromoxylyl bromides and polybromobenzyl bromides, may be employed in effecting the reaction with any of the polyhalogenated phenols given in the examples. Instead of the polyhalogenated phenols given in the examples, other polyhalogenated phenols may be employed, e. g., polychloro- and polybromocresols. In general, the preferred polyhalogenated aralkyl halides and polyhalogenated phenols are the chlorinated and/or brominated benzyl halides and phenols having three or more halogen atoms attached to the aromatic nucleus.

The polyhalogenated aralkyl halides and polyhalogenated phenols employed in carrying out the invention may be prepared by any suitable method of halogenation; for example, chlorinated benzyl chlorides may be prepared by the two-step chlorination of toluene, that is, chlorination in the side chain to produce benzyl chloride followed by chlorination to the desired degree in the aromatic nucleus. Such methods of halogenation are well known in the art. Halogenated phenols may also be prepared by known methods as, for example, by the direct halogenation of phenol and homologues thereof.

Alternatively, the compounds of the invention may be produced by the reaction of an aralkyl chloride, e. g., benzyl chloride or a homologue thereof, with an alkali metal salt of a phenol, e. g., sodium phenylate, to give the aralkyl-aryl ether which can then be halogenated, e. g., chlorinated or brominated, under such conditions that the halogen atoms enter the aromatic nuclei.

Compounds prepared in accordance with the invention are characterized by unusual stability to heat, insolubility, high refractive index, and resistance to hydrolysis with dilute acids and alkalis. Thus, all of the compounds in the examples are normally solid and have a refractive index of 1.56 or more. In general, the halogenated benzyl-phenyl ethers containing three or more halogen atoms in each aromatic ring require the heat of a Bunsen burner to ignite and will not support combustion when the flame is removed. They are, therefore, useful as organic fire retardants. On account of the high refractive index, these compounds have unusual hiding and pigmenting properties, especially when finely ground or dispersed, and are useful as organic white pigments in coating compositions and as delusterants for textile fibers such as regenerated cellulose and cellulose acetate materials. Their chemical inertness and high melting points are also advantageous in these uses. For instance, the compounds of Examples II and IV melt above 175° C., which is considered to be high melting point, while the compound of Example III has a very high melting point, i. e., above 250° C. Considerable variation in such properties as melting point, refractive index, and the like, may be obtained by varying the number and type of halogen atoms on the aromatic nuclei within the limit set forth, without the sacrifice of such properties as chemical inertness and stability towards heat. Halogenated benzyl-phenyl ethers containing four or five halogen atoms attached to each aromatic nucleus are high-melting compounds having exceptional stability to heat, acids and alkalis, and possessing high refractive indices.

Throughout the specification and claims it will be understood that the term "alkali metal" is intended to include potassium as well as sodium.

As many apparently widely different embodiments of this invention may be made without departing from the spirit and scope thereof, it is to be understood that I do not limit myself to the specific embodiments thereof except as defined in the appended claims.

I claim:

1. Ethers having an aralkyl group joined to a mononuclear aryl group through an ether oxygen atom and containing a plurality of halogen atoms in each aromatic ring.

2. A halogenated benzyl-phenyl ether containing at least three halogen atoms in each aromatic nucleus.

3. A halogenated benzyl-phenyl ether containing a plurality of halogen atoms in each aromatic nucleus and having at least three chlorine atoms in one of said nuclei.

4. A halogenated benzyl-phenyl ether containing a plurality of halogen atoms in each aromatic nucleus and having at least three bromine atoms in one of said nuclei.

5. A chlorinated benzyl-phenyl ether containing at least three chlorine atoms in each aromatic nucleus.

6. Pentachlorobenzyl-pentachlorophenyl ether.

7. Tetrachlorobenzyl-pentachlorophenyl ether.

8. Tetrachlorobenzyl-tribromophenyl ether.

HAROLD S. HOLT.